United States Patent
Bier et al.

(10) Patent No.: US 10,827,092 B1
(45) Date of Patent: Nov. 3, 2020

(54) SYSTEM THAT FACILITATES MAKING MOBILE PAYMENTS TO MULTI-FUNCTION PRINTER USING PROXIMITY NETWORK AND PAYMENT SERVER

(71) Applicant: Palo Alto Research Center Incorporated, Palo Alto, CA (US)

(72) Inventors: Eric A. Bier, Palo Alto, CA (US); Alejandro E. Brito, Mountain View, CA (US); Shantanu Rane, Menlo Park, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 16/444,099

(22) Filed: Jun. 18, 2019

(51) Int. Cl.
- *G06K 15/00* (2006.01)
- *H04N 1/34* (2006.01)
- *H04N 1/327* (2006.01)
- *H04N 1/00* (2006.01)

(52) U.S. Cl.
CPC ......... *H04N 1/346* (2013.01); *H04N 1/00307* (2013.01); *H04N 1/32776* (2013.01); *H04N 1/342* (2013.01); *H04N 1/344* (2013.01)

(58) Field of Classification Search
CPC ............... H04N 1/346; H04N 1/00307; H04N 1/32776; H04N 1/342; H04N 1/344
See application file for complete search history.

(56) References Cited

U.S. PATENT DOCUMENTS

| | | | |
|---|---|---|---|
| 9,262,771 B1 | 2/2016 | Patel | |
| 9,338,638 B1* | 5/2016 | Palin | H04W 12/08 |
| 9,501,769 B2 | 11/2016 | Guerin et al. | |
| 2007/0005645 A1* | 1/2007 | Chase | G06F 3/1207 |
| 2007/0112633 A1* | 5/2007 | Walker | G06Q 20/202 705/21 |
| 2007/0241180 A1 | 10/2007 | Park et al. | |
| 2017/0011375 A1* | 1/2017 | Takasu | G06Q 20/202 |
| 2019/0332340 A1* | 10/2019 | Somaiah | G06F 3/1222 |

FOREIGN PATENT DOCUMENTS

CN  101567106  10/2009

* cited by examiner

*Primary Examiner* — Moustapha Diaby
(74) *Attorney, Agent, or Firm* — Mueting Raasch Group

(57) ABSTRACT

A multi-function printer is coupled to a mobile device via a proximity network interface. The multi-function printer determines a workflow specified by a user of the mobile device. An ephemeral token associated with the workflow is sent to the mobile user device. The mobile device uses the ephemeral token to create a payment packet that is sent to a payment server which sends a receipt in response thereto. The multi-function printer receives the receipt from the mobile device and in response to receiving the receipt, obtains a list of payments from the payment server. The multi-function printer performs the workflow based on validating the receipt against the list of payments.

19 Claims, 11 Drawing Sheets

SYSTEM THAT FACILITATES MAKING MOBILE PAYMENTS TO MULTI-FUNCTION PRINTER USING PROXIMITY NETWORK AND PAYMENT SERVER

SUMMARY

The present disclosure is directed to a system that facilitates making mobile payments to a multi-function printer using a proximity network and a payment server. In one embodiment, a multi-function printer is coupled to a mobile device via a proximity network interface. The multi-function printer determines a workflow specified by a user of the mobile device. An ephemeral token associated with the workflow is sent to the mobile user device. The mobile device uses the ephemeral token to create a payment packet that is sent to a payment server which sends a receipt in response thereto. The multi-function printer receives the receipt from the mobile device and in response to receiving the receipt, obtains a list of payments from the payment server. The multi-function printer performs the workflow based on validating the receipt against the list of payments.

In another embodiment, a mobile user device connects to a multi-function printer via a proximity network. The mobile user device also connects to a payment service via an Internet connection. A workflow of the multi-function printer is determined and a payment packet is sent from the multi-function printer to the mobile user device. The payment packet describes a payment needed to perform the workflow. A payment token is received at the multi-function printer from the mobile device in response to the mobile device authorizing the payment with a payment server. The multi-function printer determines via the payment server that the payment server has authorized the payment. The workflow is performed in response to determining the payment gateway authorizes the payment. These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
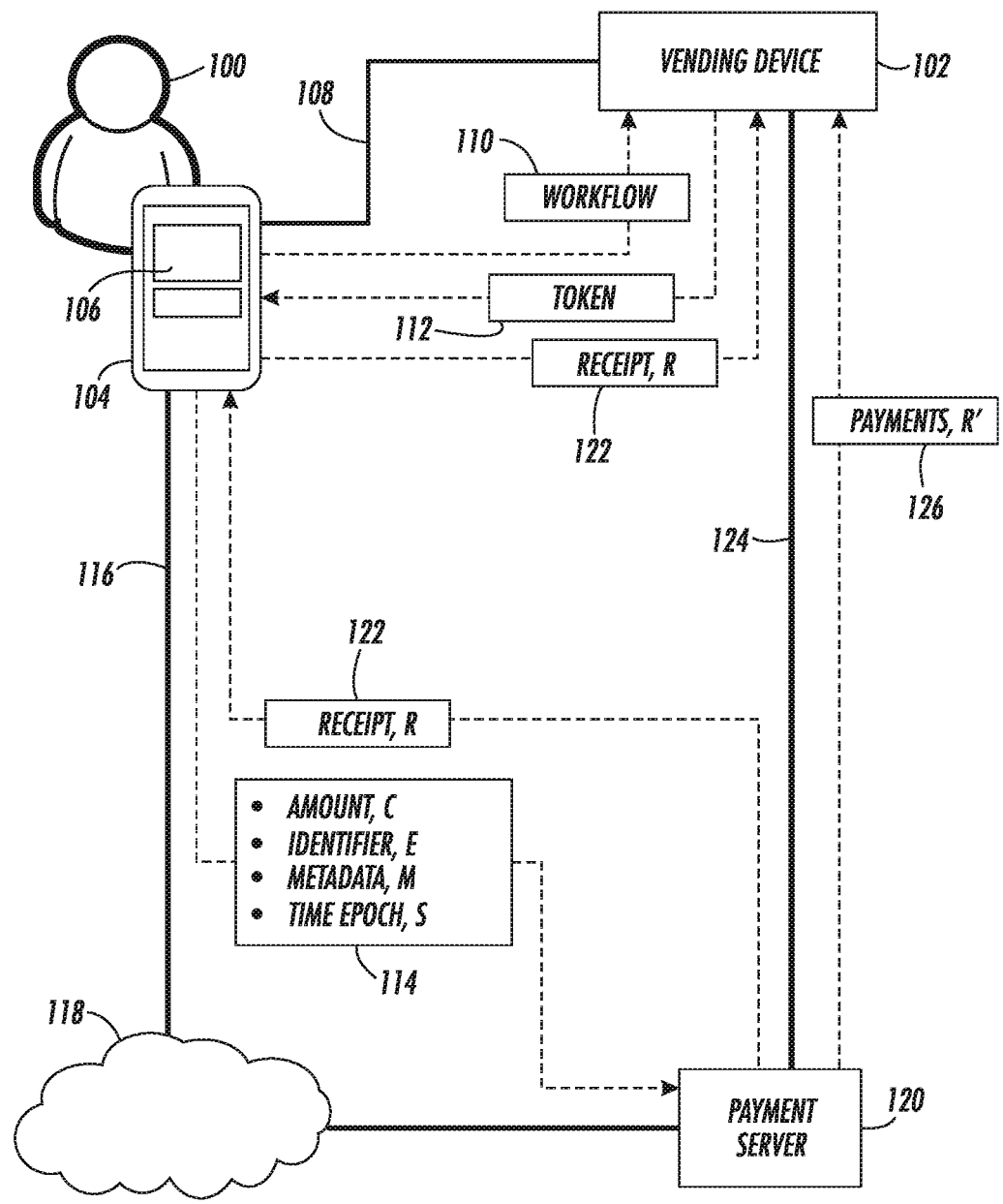
FIG. 1 is a block diagram of a system according to an example embodiment.

The present disclosure is generally related to mobile payment systems. Electronic payment systems are now ubiquitous, and used in many places besides traditional point of sale locations. For example, goods and services can be provided by unattended terminals, such as product or ticket vending machines, vehicle access points (e.g., car washes, parking garages), etc. These payment terminals are usually modeled on a point of sale terminal used in retail stores and the like. For purposes of these discussions, the term 'payment terminal' refers to functionality of a device that manages payments, and 'vending device' is a device that interacts with the payment terminal to provide a good and/or service to a payee. The payment terminal and vending device may be separate devices or integrated into a single unit of hardware and/or software.

A payment terminal typically receives a payment token such as a credit card number as well as an indicator for the amount to be charged. This information is sent via a network to a payment service provider that validates the transaction based on the token and amount. If the transaction is approved, the terminal provides the product or service to the payee. Generally, the payment terminal is specific to a particular financial institution (e.g., bank) or a quasi-banking entity that acts as an intermediary between user accounts and financial intuitions (e.g., PayPal). This can make such terminals less flexible given the increasing number of options available for payment. Further, the use of such terminals requires the purchase of additional hardware, and the use of the hardware may come with fees that may reduce the profit of products and services offered by vending devices.

Mobile devices (e.g., cellular phones, wearable devices) are increasingly used in financial transactions such as mobile banking and electronic payments. Most mobile based payment schemes today (e.g., PayPal, Apple Pay, Google Wallet) are executed from point-of-sale payment terminals in a similar manner to a credit card. The payment terminals are attached to the vending device or co-located with the vending device or are monitored by a human operator. The payment workflow is begun when the user taps the payment terminal with their phone, and the phone initiates the payment, e.g., using a near-field communications (NFC) sensor. The payment terminal then sends the payment information, including the transaction ID, the card number or a number derived from it, the payment amount, and any additional metadata further into the payment processing pipeline. This receiver of the payment data could be a payment gateway, a merchant, or a bank server that returns a feedback signal to the payment terminal after the payment is processed. If the payment is deemed legitimate, the payment terminal instructs the vending device to perform the desired workflow. Note that, in this case, the mobile device may serve as a substitute for a credit or debit card, while the sending of the payment and the reception of the acknowledgment or non-acknowledgment is all accomplished by the payment terminal.

There is a second class of mobile payments made to vending devices or to networked devices such as washers and dryers at laundromats. In this case, the mobile device communicates with a payment server and establishes an account or a subscription with the service provider, and deposits an appropriate amount in that account. This step can be performed far away from the vending device. The payment server updates the balance in the user's account, which is held with the service provider. The user then approaches the vending device and requests the vending device to perform the desired workflow, e.g., print, scan, wash, dry. The vending device connects to the user's account (held with the service provider, not a payment service), and verifies the user's account balance. If the balance amount is sufficient for the desired workflow, then the vending device receives an acknowledgement and the user is instructed to finish the workflow at the vending device. If needed, the vending device then interacts with the mobile device as required by the workflow.

Systems described herein enable vending device functionality (e.g., multi-function printer functionality) to be directed and executed from a mobile device. An application on the device enables the mobile device user to employ a variety of payment options, according to his or her preferences. Vending device service providers are not required to be involved in setting up or maintaining the payment service. Nor is the user required to maintain an account with the vending device service provider. While the system will obtain payment information from the user, the vending device does not request or store the actual payment information for verification, but rather a cryptographic digest proving that the payment satisfied specified requirements. In some embodiments, a multi-function printer (MFP) has vending device functionality added or embedded within the MFP.

In FIG. 1, a block diagram illustrates a system and method according to an example embodiment. A user 100 approaches a vending device 102 with a mobile device 104. Using a mobile application 106, the user 100 establishes a connection (e.g., Bluetooth® pairing) with the vending device, as indicated by line 108. When the connection is established, the user requests a desired workflow 110 via inputs to the mobile application 106. For example, the workflow 110 may specify printing X copies of a document containing Y pages, double sided, in color. Note that this workflow may be considered both a product and a service, as the print media (e.g., paper, cardstock, transparency) is a product and the imaging onto the print media may be considered a service. The vending device sends an ephemeral token 112 to the mobile device 104 in response to the workflow request.

The mobile application 106 determines the cost of executing the workflow 110, e.g., provided by the vending device 102 with the token 112 or calculated using local or remotely accessed data. The mobile application 106 shows the user 100 the price, as well as a list of payment options. The user 100 chooses one of the payment options, and executes the payment. For this purpose, the user 100 might need to securely provide a username and password (e.g., PayPal payments via OAuth), or a biometric token (e.g., Apple Pay payments using the mobile device's Secure Enclave) via the mobile device 104.

The mobile device creates a payment packet 114 that includes the following information: the amount of the payment, C; the account number or an ephemeral identifier derived from the account number, E; metadata M about the payment (e.g., the ephemeral token 112 identifying the vending device), and the time epoch S during which the transaction occurs. Note that the amount of the payment C could be a payment limit, one that may be adjusted based on an outcome of the workflow, that will be discussed in greater detail below. One way to generate M is to use cryptographic hash functions, such as SHA-256. Thus, in one embodiment, M=SHA256(T S), where T is the token 112 and S is the time epoch. In other embodiments, an analogous payment packet may be initiated on the vending device 102 and later communicated to the mobile device 114.

As indicated by line 116, the mobile device 104 is also capable of connecting to a wide area network 118, such as a mobile carrier network that provides Internet access. The user 100 has an account or other payment relationship with an Internet accessible payment server 120 The mobile device encrypts the payment information, e.g., P=[C∥E∥M] with the public key of the payment server 120 or the payment gateway server (not shown) and sends the result 114, along with the token 112, to the payment server 120 or the payment gateway server.

The mobile device 104 receives from the payment server 120 or the payment gateway server a cryptographic receipt 122 of the payment, for example a cryptographic digest such as R=SHA256(P). The mobile device forwards the receipt 122 to the vending device 102. The vending device 102 is also coupled to the payment server 120 or payment gateway server as indicated by line 124 (which would generally be made via network 118, but not shown coupled this way in the drawing for clarity). After the vending device 102 obtains receipt 112 from the mobile device, the vending device 102 requests from the payment server or the payment gateway server, a list of payments it has received in the epoch S.

In some embodiments, the vending device 102 might request a list of payments it has received in the epoch S, for a vending device with an ephemeral token T. It receives a payment list R' 126. The vending device 102 compares the receipt R 122 received from the mobile device 104 against payments R' 126 received from the payment server or the payment gateway server. If the most recent payment in list R' matches the receipt R, the vending device executes the work flow 110. In some scenarios, if the user quickly resends the same request during the epoch (e.g., a user wants to get 20 copies but only pay for 10), it is possible that the vending device 102 will honor both requests but only receive payment for one. To prevent this, the mobile device 104 can include a unique sequence number in the receipt R 122. The vending device 102 will proceed with service only if the payment information matches, the payment is recent, and the sequence number has not been seen before. Similar workflows can be written for mobile scanning and copying at a vending device kiosk and for other service appliances like washers, dryers, food vending machines, ticket vending machines, car washes, etc. This sequence (or a similar sequence) can be repeated multiple times for a single transaction, e.g., setting a payment limit or estimate before the workflow is performed and adjusting the payment after the workflow is performed, assuming the cost for the workflow is different than the limit or estimate.

None of these workflows require any NFC or RFID payment module to be installed on the vending device 102 or equivalent device. Furthermore, none of these workflows require the mobile application 106 to communicate with a cloud-based mobile transaction server, e.g., a mobile print server. Since payment is accomplished using the mobile application 106, it is sufficient to incorporate software that performs cryptographic payment verification on the vending device 102 or equivalent device.

Generally, the mobile device communicates to the vending device using an opportunistic connection (not an existing wireless connection) 108, such as Bluetooth or Wi-Fi Direct. The user has the option to use a variety of payment mechanisms, including credit or debit cards, or mobile payments (Apple Pay, Google Wallet, PayPal). The verification of payment is carried out by the vending device by means of an interaction with the payment server or a payment gateway.

In some embodiments, the mobile device 104 is required to be in the vicinity of the vending device 102 in order to successfully communicate with the payment service 120. This can help protect against unauthorized payments from the mobile device 104, e.g., due to malware or accidental launching and use of the application. Furthermore, the mobile phone communicates with the payment service over a wired or wireless network 118 (e.g., LTE, Wi-Fi), which can be distinct from the communication channel 108 used for communicating with the mobile device 104 (e.g., Bluetooth, Wi-Fi direct, optical, audio signals). The mobile device 104 verifies other aspects of the payment, such as when the payment was made, if the payment was sufficient for the desired workflow, etc. The vending device 102 then interacts with the mobile device 104 as required by the workflow 110.

Figure 2:
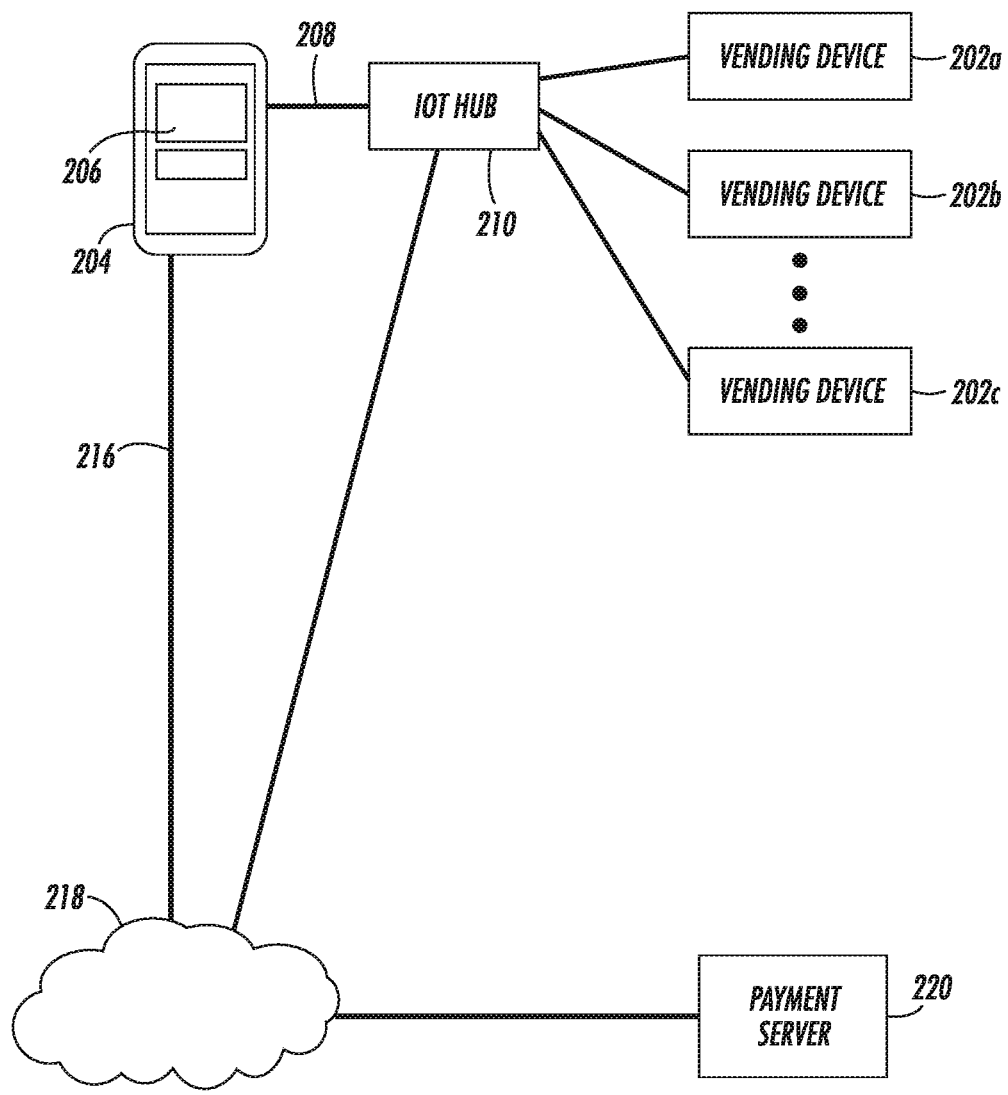
FIG. 2 is a block diagram of a system according to another example embodiment.

In some embodiments, a large number of vending devices may be co-located, such as in a university library which has multiple printers, scanners, copiers, etc., or a laundromat with multiple washers, dryers, soap dispensers, etc. In such a case, it could be confusing to connect using a technology such as Bluetooth to a particular vending device, because the user would have multiple Bluetooth devices that could be paired with and could be frustrating to search through a list, e.g., looking for 'washer-1234' in a list of devices, and potentially selecting the wrong one. In FIG. 2, a diagram illustrates additional system features that can manage multiple, co-located vending devices according to an example embodiment.

In this embodiment, a user's mobile device 204 includes an application 206, which may be similar to or the same as the application 106 in FIG. 1. The mobile device 204 is capable of connecting via a local communications link 208 and a remote communications link 216 as previously described. In the latter case, the mobile device 204 can connect to a payment server 220 via a wide area network 218. A plurality of vending devices 202*a*-202*c* are co-located and accessible by the user, but in order to use the devices 202*a*-202*c* the user connects to an Internet-of-Things (IoT) hub 210 that intermediates communications between the mobile device 204 and the vending devices 202*a*-*c*.

In this way, instead of seeing a list item (e.g., Bluetooth device) for each vending device 202*a*-202*c*, the user can see a single list item, such as "Printing Services" or "Laundry Services." Once connected to the hub 210, the application 206 and hub can negotiate and set up one or more workflows from all available products and/or services provided by the vending devices 202*a*-202*c*. This can also be a useful way to advertise some services of which the user may not be aware. For example, if the user is intending to make multiple copies of a multiple page document and wants the copies stapled, the user may not be aware that some of the vending devices 202*a*-202*c* have a built-in stapler. The hub 210 can both advertise this capability as well as direct the user to a particular device that has this capability, in case some do not.

Figure 3:
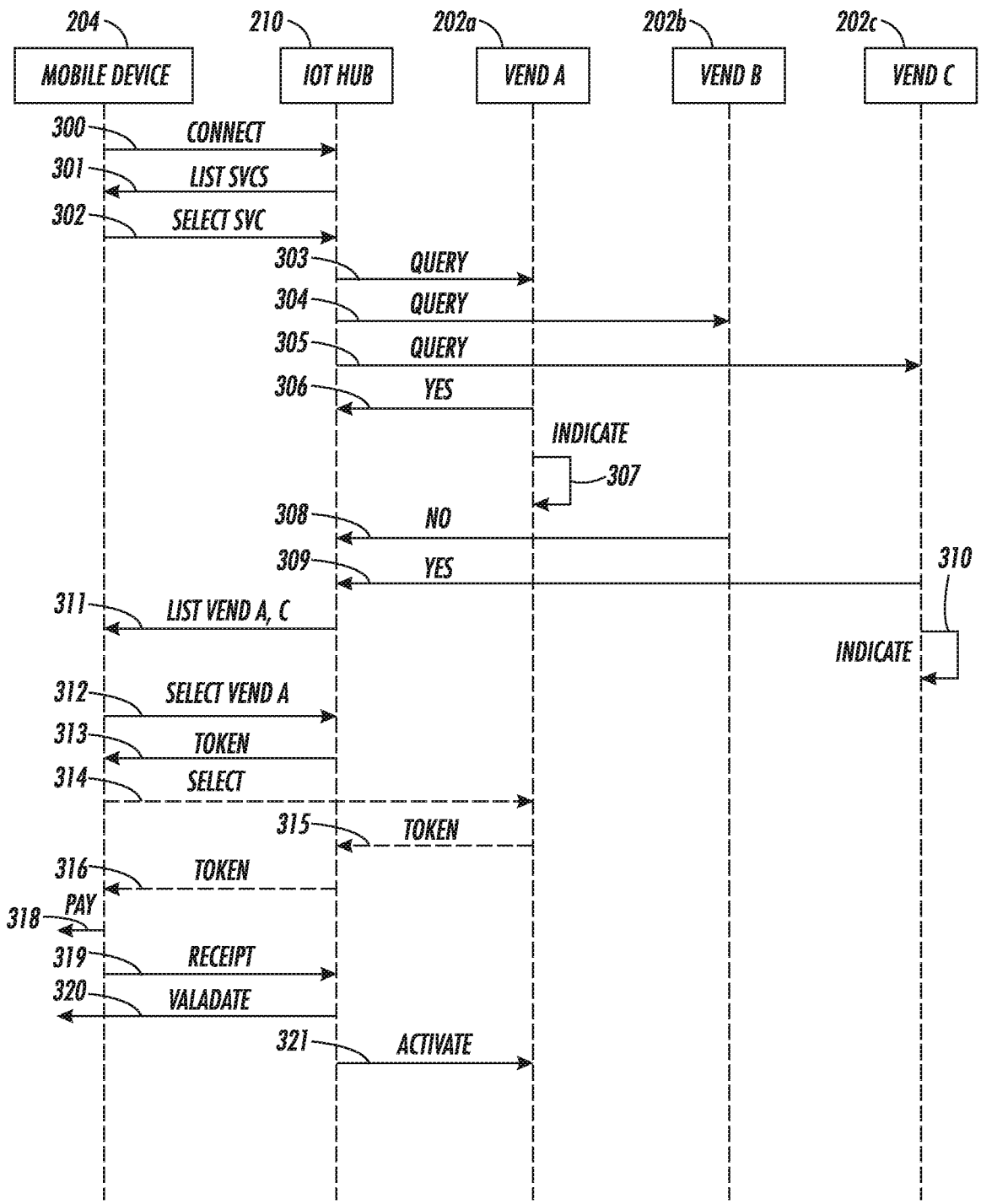
FIG. 3 is a sequence diagram illustrating operation of system components according to an example embodiment.

In FIG. 3, a sequence diagram illustrates an example of how the arrangement shown in FIG. 2 may operate according to an example embodiment. The interaction starts with the mobile device 204 connecting 300 to the hub 210. In response, the hub provides a list of service 301, which may use an established protocol between the hub 210 and the application of the mobile device 204. For example, in a model-view-controller (MVC) paradigm, the mobile device 204 may provide the controller and view functionality, while the hub 210 sends just the data used in the model. In other embodiments, the hub 210 may provide all the MVC functions, e.g., using a web server that is accessed by a browser on the mobile device 204.

The list of service 301 may allow for multiple selections, and may be customized for a current state of the vending devices 202*a*-*c*. For example, in a printing environment, the list 301 may allow performing multiple jobs in parallel, and the services available would be tailored based on options installed on the devices 202*a*-*c*, condition of the devices 202*a*-*c* (e.g., low on color toner, thus black and white printing only), availability, etc. Also, as the print media may be considered a product, special print media (e.g., envelopes, transparencies) may be selected in this way. In a laundromat scenario, the list 301 may allow buying both products (e.g., detergent) and services (e.g., washer and dryer use) in a single transaction.

The mobile device 204 determines a user selection of products and/or services and sends selection data 302 back to the hub 210. In some situations, multiple ones of the vending devices 202*a*-*c* may be able to service the request, so the hub sends queries 303-305 to all of the appropriate devices. In response to the queries 303-305, devices 202*a* and 202*c* send affirmative responses 306, 310, while device 202*b* sends a negative response 308. In order to ease choosing the correct vending device, devices 202*a* and 202*c* also may indicate 307, 310 their availability to the user. These indications 307, 310 may be a light, a lighted push button, an indicator on an LED, display, etc. The hub 210 also sends a list 311 of the devices that can service the request to the mobile device 204, which displays them to the user.

In this example, the user selects vending device 202*a* via the mobile device 204, upon which a token 313 is returned via the hub 210. The hub 210 itself may generate the token 313, or the selected vending device 202*a* may generate the token and send it to the mobile device 210. In an alternate arrangement indicated by dashed lines 314-316, the selection may be made directly at the selected device 202*a* (e.g., pressing a lit button at the device), which then either sends the token itself or signals for the hub 210 to send the token. Steps 318-321 involve the payment and validation as described in FIG. 1. Note that actions 318 and 320 occur with a payment service or payment gateway, which are not shown in this diagram.

Figure 4A:
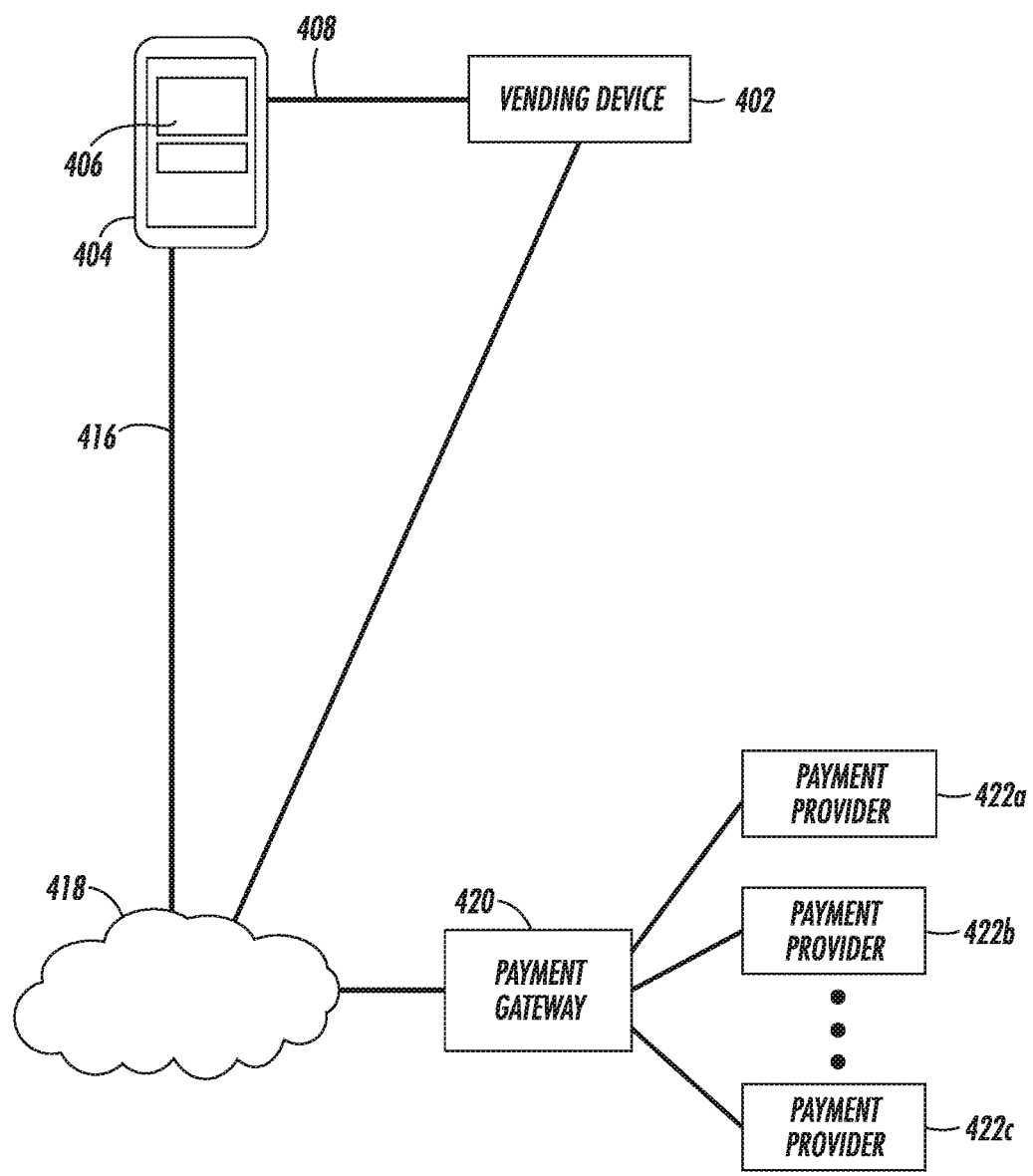
FIGS. 4A and 4B are a block diagrams of systems according to other example embodiments.

In reference now to FIG. 4A, a diagram illustrates additional system features that can manage multiple payment services according to an example embodiment. As with other embodiments, a user's mobile device 404 includes an application 406, which may be similar to or the same as the application 106 in FIG. 1. The mobile device 404 is capable of connecting via a local communications link 408 and a remote communications link 416 as previously described. In the former case, the mobile device 404 can connect to a single vending device 402 via a proximity link 408. This example can be extended to multiple vending devices as in the example shown in FIG. 2.

In this example, the mobile device 404 and vending device 402 are able to access one or more wide area networks 418. In this example, the application 406 and vending device 402 select, authorize, and verify payments via a payment gateway 420 that may provide a generic interface that facilitates accessing a plurality of payment providers 422*a*-*c*. In this way, the complexity of managing different payment systems can be kept at the payment gateway 420, allowing a variety of mobile devices 404 and vending devices 402 to utilize a single, generic, payment interface. This can allow adding or removing payment providers 422*a*-*c* without necessitating changes in the mobile devices 404 and vending devices 402.

In addition to allowing the use of the multiple payment providers 422*a*-*c*, the payment gateway 420 can handle some of the transactions unique to this system. For example, data such as the payment packet 114, receipt 122, and payment list 126 shown in FIG. 1 can be managed by the payment gateway 420. This frees the payment providers 422a-c from having to implement additional protocol features in order to participate in the vending system.

Figure 4B:
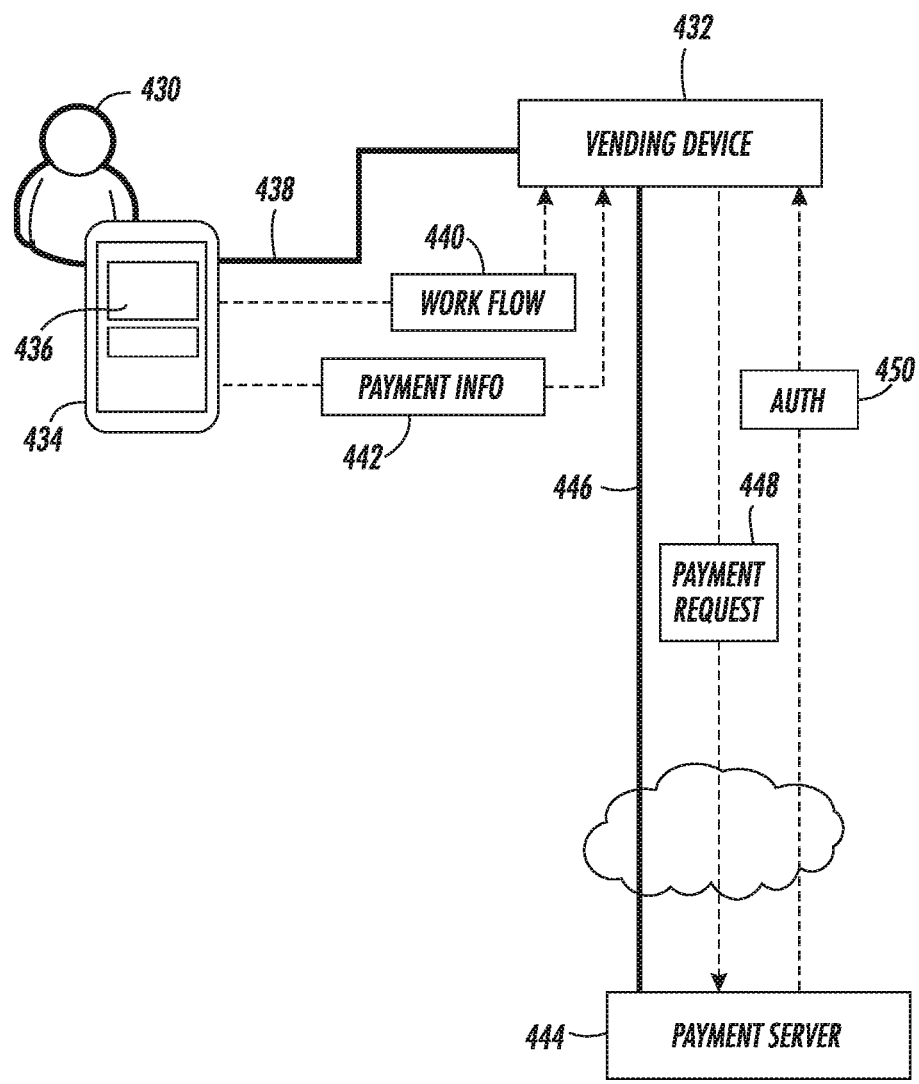

In reference now to FIG. 4B, a diagram illustrates a payment system according to another example embodiment. A user 430 approaches a vending device 432 with a mobile device 434. Using a mobile application 436, the user 430 establishes a connection (e.g., pairing) with the vending device, as indicated by line 438. When the connection is established, the user requests a desired workflow 440 via inputs to the mobile application 436. In this case, the mobile application 436 also sends payment information 442, e.g., credit card number, payment account number, etc., to the vending device 432. This could occur after the user 430 browses and selects a workflow available from the vending device 432.

Instead of the mobile device 434 making the payment, the vending device 432 interacts directly with a payment service 444 (e.g., via Internet connection 446) to make a payment request 448 for the job that was communicated to the vending device 432 from the mobile device 434 via the workflow information 440. In this case, one security issue is to ensure that the job request received by the vending device 432 is indeed the request that was approved by the user 430 and sent by the mobile device 434 and that the payment amount 442 is indeed the amount that the user agreed to. To achieve that assurance, the payment information 442 and the workflow request 440 (which would include the proposed price) are sent from the mobile device 434 to the vending device 432 in an encrypted packet so it could not be spoofed by an adversary. If the payment is authorized 450 by the payment service 444, then the workflow can proceed.

The authorization data 450 may include specific data that helps the vending device 432 determine that the payment is for the valid amount and for the specific workflow, e.g., using a unique workflow identifier. For example, the payment service 444 may be able to both encrypt the payment information as well as encrypt another packet formed by the vending device 432 that includes a workflow identifier and payment amount. The payment service 444 may only authorize the payment if both packets agree on price and workflow identifiers. Note that this embodiment can be adapted to use a payment gateway as in FIG. 4a as well as an IoT hub as in FIG. 2. In the latter case, either the hub 210 or the vending devices 202a-c could connect to the payment service as described in relation to FIG. 4B.

In summary, a vending device such as an MFP is described that can verify aspects of the payment including the paid amount, the time of payment, the location of the payment, the mode of payment. The vending device may be capable of communicating bi-directionally with a mobile device over Bluetooth, Wi-Fi Direct, Zigbee, NFC, etc. The vending device can obtain payment verification information from an intermediate payment gateway server, that stores payments from a plurality of vending devices, and in turn communicates with payment service providers that process the payment.

In some embodiments, the mobile device can, in addition to serving as a substitute for a credit card, initiate payments using mobile payment mechanisms including PayPal, Apple Pay, Google Wallet, Samsung Pay, cryptocurrency, etc. Thus, there needs to be no payment terminal attached to or in the vicinity of the vending device nor is there a need for a payment service to be housed at the vending device.

The vending device can obtain payment verification information from a server that stores completed payments made using a cryptocurrency. The vending device can independently determine the cost of a given workflow, as opposed to this being performed by the mobile app. This system does not require the vending device's service provider to be involved in setting up or maintaining the payment service, nor is the user required to maintain an account with the vending device's service provider.

The vending device does not need to request actual payment information for verification, but rather uses a cryptographic digest proving that the payment satisfied specified requirements. The mobile device and the vending device do not need a network connection established between each other with user credentials for the workflow to be initiated. For example, an ad-hoc, peer-to-peer network may be used for mobile-device-to-vending-device communications.

Figure 5:
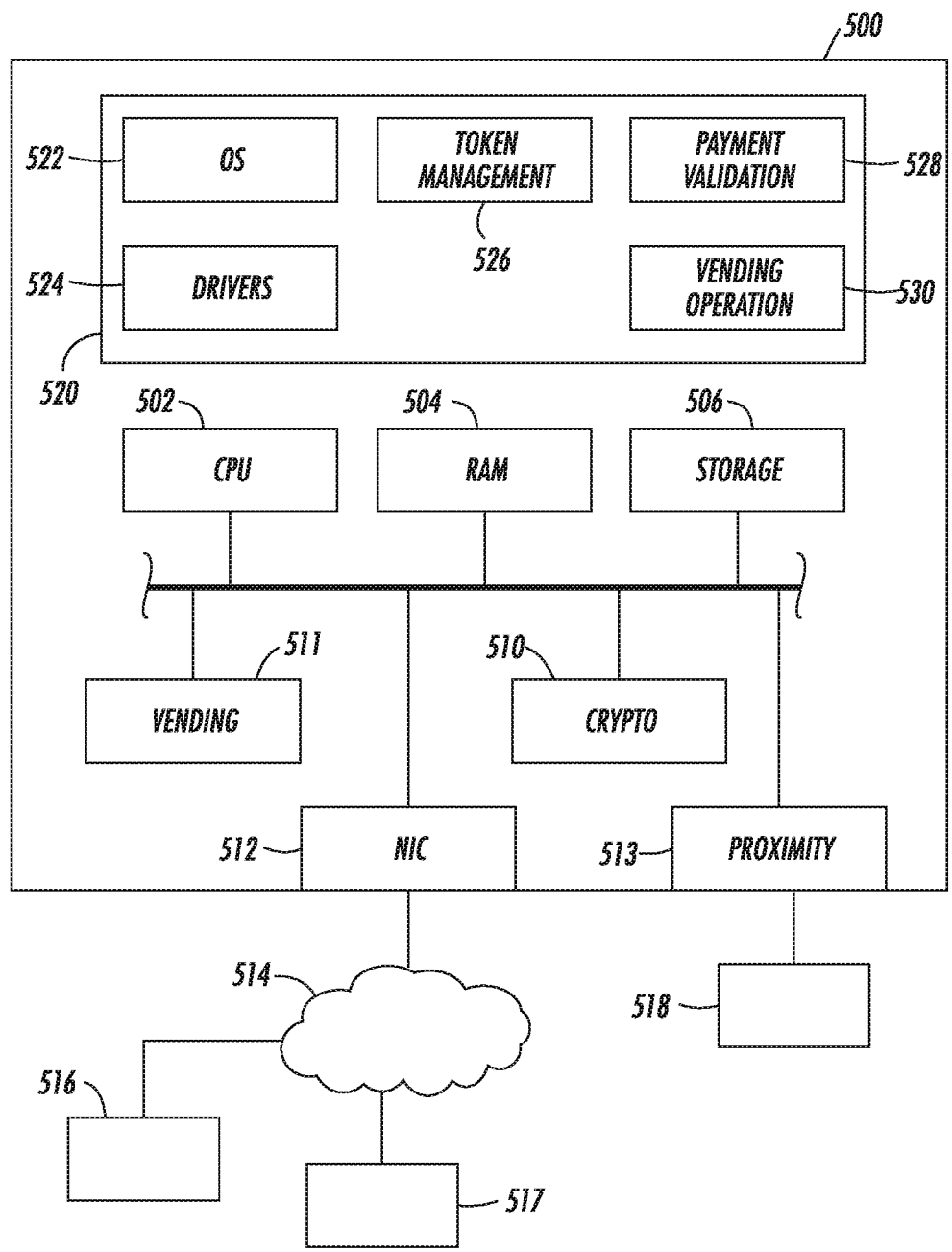
FIG. 5 is a block diagram of a device according to an example embodiment.

Generally, the systems described herein can be implemented using conventional or custom processing hardware, e.g., personal computers, servers, routers, gateways, embedded devices, application-specific integrated circuits, mobile devices, etc. In FIG. 5, a block diagram shows a vending device 500 according to an example embodiment, which may be used in any of the systems shown in FIGS. 1-4B. The device 500 includes one or more processors 502 such as a central processing unit, co-processor, digital signal processor, etc. The processor 502 is coupled to memory, which may include both random access memory 504 and persistent storage 506, via one or more input/output busses 508. Other general-purpose or special-purpose hardware may be coupled to the bus 508, such as cryptographic module 510, vending hardware 511, network interface 512, and proximity network interface.

The network interface 512 facilitates communications via a network 514 with other Internet computing nodes 516, 517. These computing nodes 516, 517 may include any combination of payment providers, payment services, payment gateways, etc., as described elsewhere herein. The network 514 may include a combination of local area links and wide area communications backbones. The proximity network interface 513 facilitates communications with a mobile device 518 that is in proximity, e.g., within wireless communication range.

The device 500 includes software 520 that facilitates communications, payments, and vending services as described herein. The software 520 includes an operating system 522 and drivers 524 that facilitate communications between user level programs and the hardware, as well as managing at least some layers of the network communications protocols. The software 520 may include specialized software components, such as a token management module 526 and payment validation module 528 that manages tokens used to validate payments between the mobile device 518 and various Internet payment servers 516, 517. A vending operation module 530 manages specialized hardware used by the device 500 to provide products and/or services to a user of the mobile device 518. This vending operation module 530 may also provide data used to show to the user the various products/services available, prices, and enable selection of the products/services.

In some embodiments, the modules 526, 528, 530 may be implemented as add on hardware, e.g., a single-board computer or embedded controller, that interfaces with one or more such vending devices 500, e.g., via NIC 512 or other I/O interface (e.g., USB). In other embodiments, the functionality of the modules 526, 528, 530 may be implemented with software 520 running on each vending device 500. In the latter case, additional hardware may be implemented as part of the vending hardware 511, such as random number generators, tamper prevention, etc.

Figure 9:
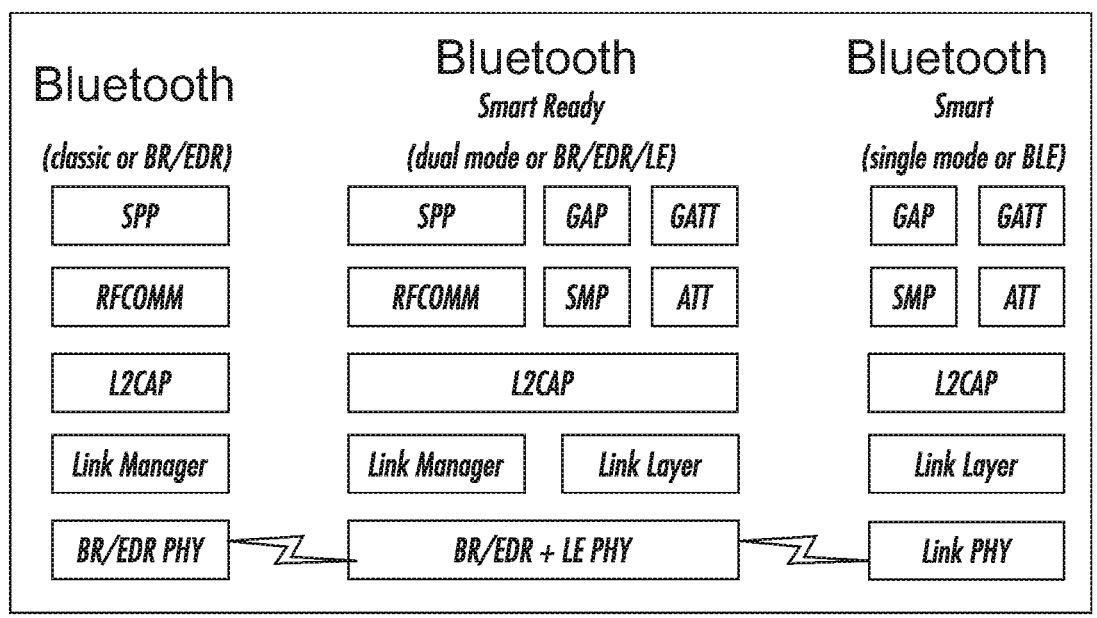
FIG. 9 is a diagram of a Bluetooth protocol stack used in a vending device according to an example embodiment.

In some embodiments, the proximity interface 513 of vending device 500 may utilize a Bluetooth Low Energy (BLE) wireless technology-based mobile payment application. In such an implementation, the vending device 500 is BLE enabled with the capability of running peripheral/slave Bluetooth profile services, e.g., via one or more of modules 526, 528, 530. The mobile device 518 is also BLE enabled with the capability of running central/master Bluetooth profile services. The same payment application may use the Bluetooth serial port profile (SPP), which is based on the RFCOMM transport protocol that provides emulated RS-232 serial ports and operates on top of the Logical Link Control and Adaptation Protocol (L2CAP), as shown in the block diagram of FIG. 9.

There are notable differences between Bluetooth protocols and profiles. Protocols are the layers used by all devices realizing the Bluetooth specification. These protocols implement the data transmission functionality between devices including packet formatting, routing, multiplexing, encoding, decoding, etc. Profiles are the top layer and the main way to interact with applications. These profiles define how the protocols can be used to achieve generic modes of operation. Such profiles include Generic Access Profile (GAP), Generic Attribute Profile (GATT), and Serial Port Profile (SPP). Such profiles may include specific modes for particular use cases (Proximity Profile, Glucose Profile, etc.). In this case, the vending device may use a generic profile or a specific profile, e.g., Vending Device Profile, MFP Vending Device Profile, etc.

In the case of the Bluetooth-based mobile payment application, both GATT and SPP can be used for the implementation of services dealing with the data exchange between devices. When using the application BLE mode, the GATT services and characteristics define the data models and functions to allow discovering, reading, writing, and pushing data elements between devices. In a similar way, the SPP services can be used to accomplish the analogous functionality when using the Bluetooth serial mode.

Figure 6:
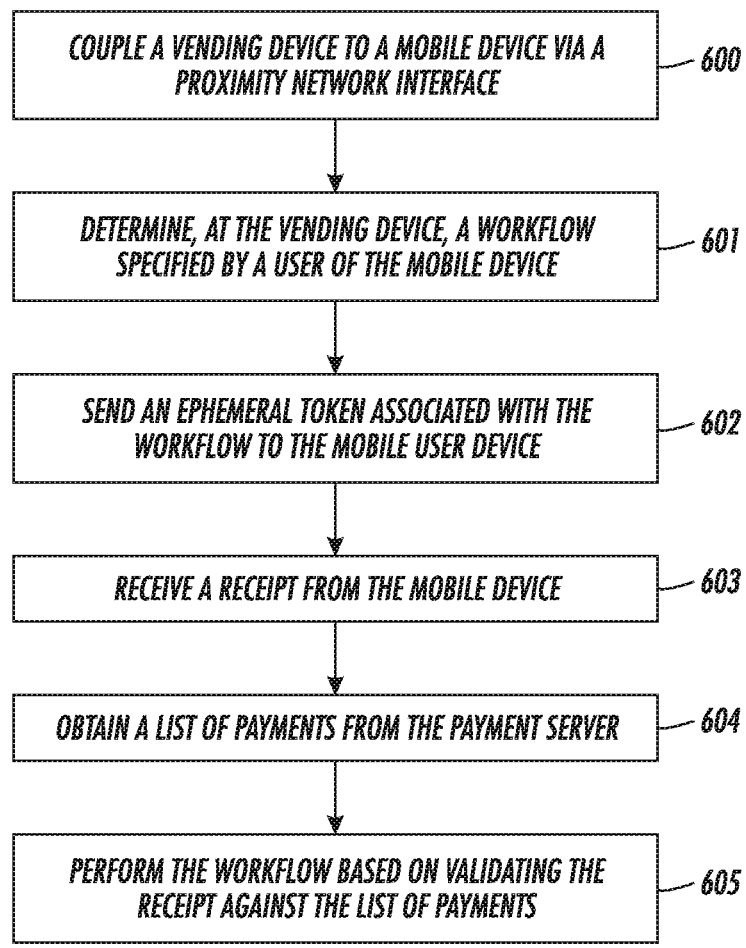
FIGS. 6, 7, and 8 are flowcharts of methods according to example embodiments.

In FIG. 6, a flowchart shows a method according to an example embodiment. The method involves coupling 600 a vending device to a mobile device via a proximity network interface. The vending device determines 601 a workflow specified by a user of the mobile device, and sends 602 an ephemeral token associated with the workflow to the mobile user device. The mobile device uses the ephemeral token to create a payment packet that is sent to a payment server which sends a receipt in response thereto. The vending device receives 603 the receipt from the mobile device, and in response to receiving the receipt, obtains 604 a list of payments from the payment server. The workflow is performed 605 based on validating the receipt against the list of payments.

Figure 7:
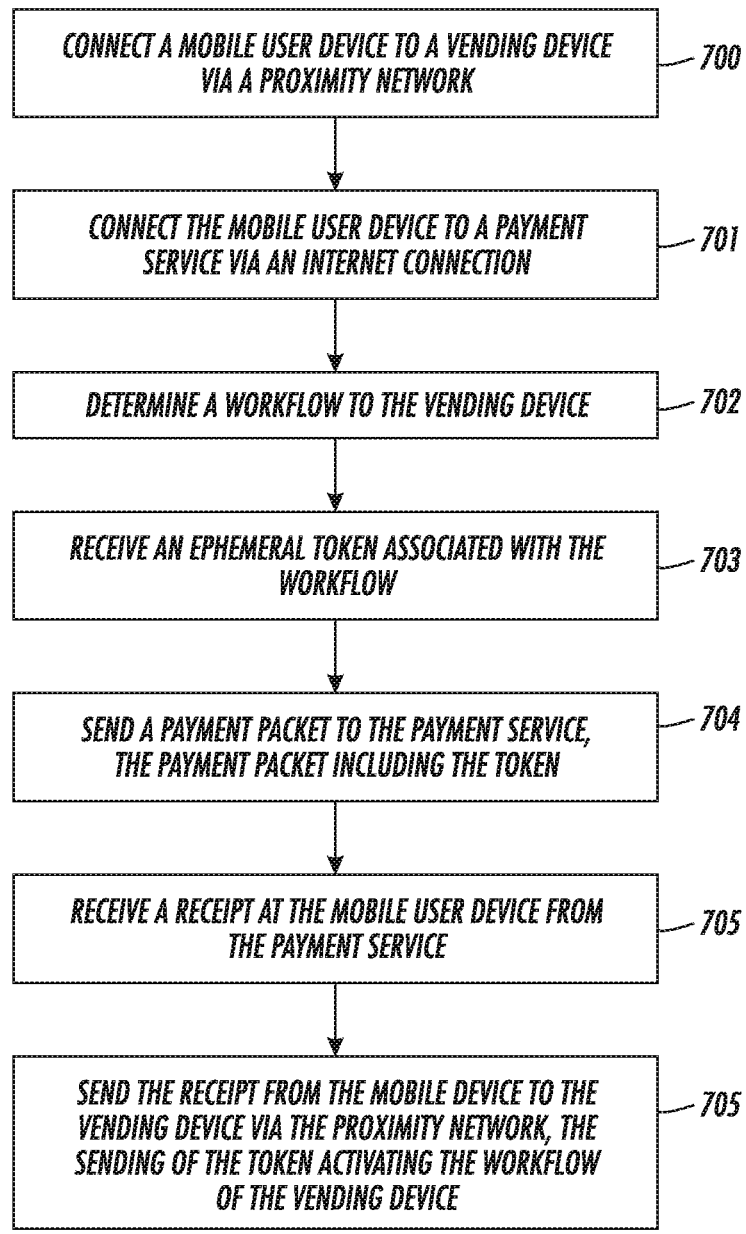

In FIG. 7, a flowchart shows a method according to another example embodiment. The method involves connecting 700 a mobile user device to a vending device via a proximity network. The mobile user device is also connected 701 to a payment service via an Internet connection. A workflow of the vending device is determined 702 and an ephemeral token associated with the workflow is received 703 in response thereto. The mobile device sends 704 a payment packet to the payment service, the payment packet including the token. A receipt is received 705 at the mobile user device from the payment service and the receipt is sent 706 from the mobile device to the vending device via the proximity network. The sending of the token activates the workflow of the vending device.

Figure 8:
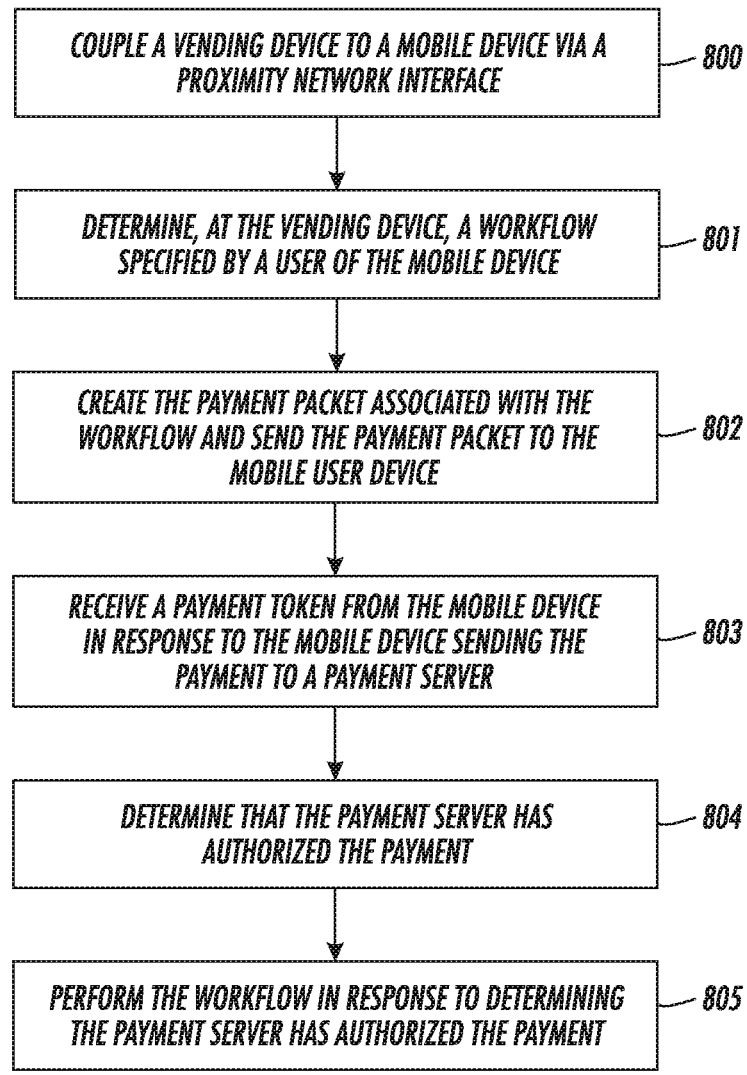

In FIG. 8, a flowchart illustrates a method according to another example embodiment. The method involves coupling 800 a vending device to a mobile device via a proximity network interface. The vending device determines 801 a workflow specified by a user of the mobile device. The vending device receives 802 payment information from the mobile device based on the workflow and sends this payment information to a payment service. A payment authorization is received 803 from the payment server in response to the mobile device authorizing a payment with a payment server. The vending device determines 804 that the payment server has authorized the payment (e.g., accepted the payment packet). The workflow is performed 804 in response to determining the payment gateway has authorized the payment.

As noted above, an MFP may implement vending device functionality as described above. An MFP may be considered as providing both a service (e.g., scanning, faxing, copying, printing) and a product (e.g., the paper on which copies and prints are made). The end price of such services can be computed based on the number of originals, the configuration of the printed product if printing is involved (e.g., color versus black-and-white, paper size, single sided or duplex printing). Therefore, in a sequence such as shown in FIG. 3, the MFP and mobile device may engage in additional transactions that precisely define the products and services provided, as well as having some flexibility in defining the terms of payment.

Figure 10:
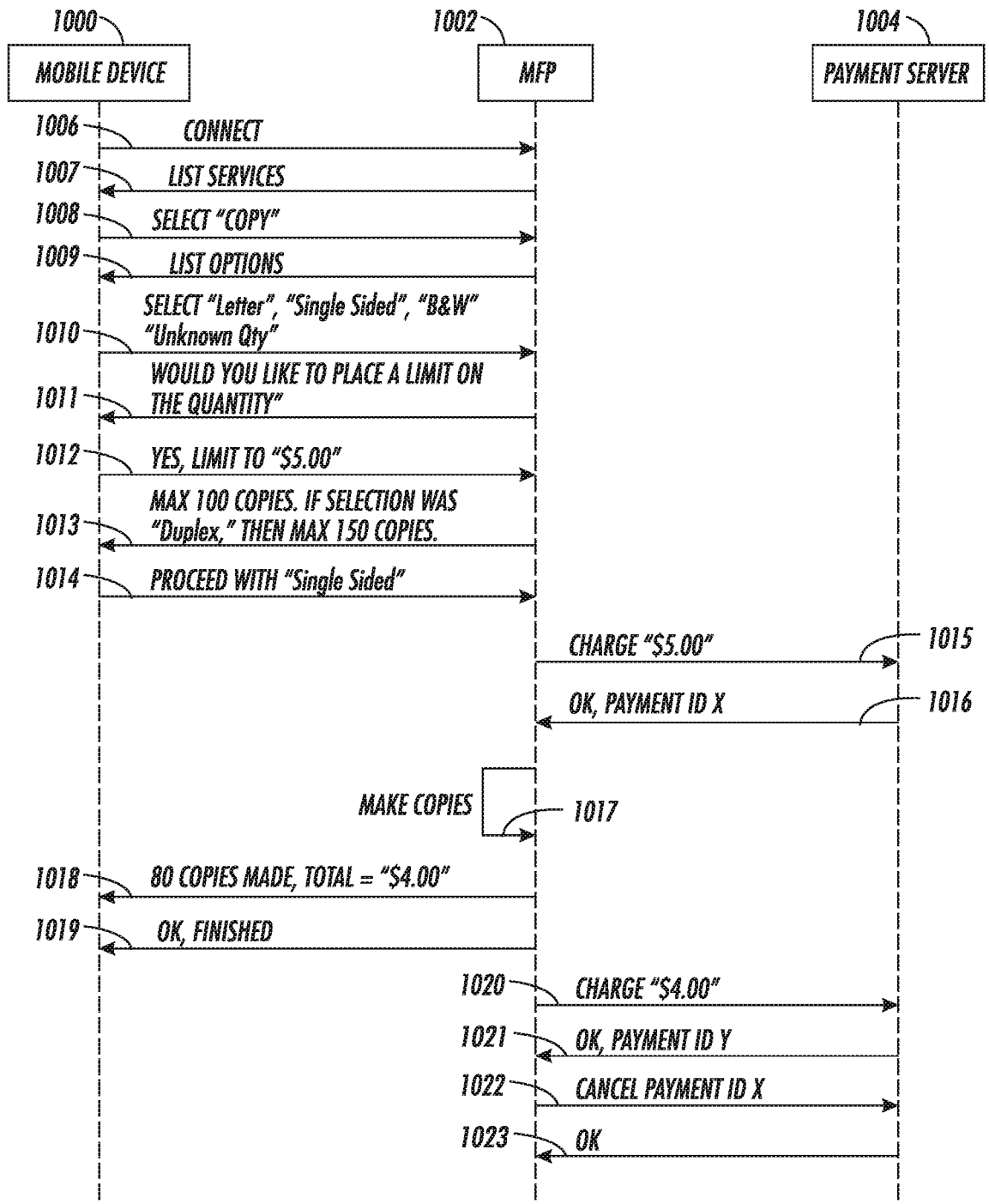
FIG. 10 is a sequence diagram showing interaction with a multi-function printer according to an example embodiment.

In one example, the user may have a stack of original documents but be unaware of exactly how many documents are in the stack. In such a case, the user may just wish to make an estimate on the number of documents and define a limit on cost or number of copies for the session. In FIG. 10, a sequence diagram shows an example transaction between a mobile device 1000, an MFP vending device 1002, and a payment server 1004 according to an example embodiment. The mobile device 1000 connects 1006, e.g., via a Bluetooth pairing operation. The MFP 1002 provides a list 1007 of services, and the user selects 1008 a copy operation. The MFP 1002 provides a list 1009 of options, and the user selects 1010 a number of them.

Note that one of the options 1009, number of copies, allows the user to select "Unknown Quantity." In response to this, the MFP 1002 further prompts 1011 the user to place a limit on the operation, e.g., a dollar or page limit. In this case, the user responds 1012 with a dollar limit. Note that if the user places no limits, the MFP 1002 may still place a practical limit on the amount charged, e.g., $100, and this may be communicated to the user via another message (not shown). In this case, the MFP 1002 performs a calculation of cost per copy of the dollar limit and informs the user via message 1013 of the maximum amount of copies for this limit. The message also suggests a way the user could save money, e.g., duplexing the copies to save on sheets of paper.

The user responds 1014, keeping the original copy parameters, and the MFP 1002 charges the amount via transactions 1015, 1016 with the payment server 1004, e.g., in any of the ways described above. The transaction is cleared via acknowledgement 1016, and so copy operation 1017 is performed, which may involve additional prompts (not shown) to the user via mobile device 1000 or MFP 1002, such as "Place documents in feeder." Once the copy operation 1017 is complete, the MFP 1002 provides a tally 1018 to the user, which the user acknowledges 1019. The MFP 1020, 1021 then charges 1020, 1021 the new amount, and assuming this is accepted, the old payment is canceled 1022, 1023. There may be other ways to charge the final amount, e.g., if the system allows changing the amount of payment X.

It will be understood that there may be many variations on the procedure shown in FIG. 10. Generally, this illustrates an example of how a number of units limit or monetary limit on the provided service may be specified and how an adjustment to the amount paid may be implemented between the MFP 1002 and the payment service 1004. Note that the limit can be extended to cover any per unit transactions of the MFP, such as pages scanned, pages faxed, pages printed, and may also cover other units, e.g., bytes of data scanned or faxed. Also, instead of a limit, an estimate of the payment may be made instead of a hard limit, and if the final amount is less than the estimate, the adjustment process may be as shown in FIG. 10. If the final amount is more, then an additional charge may be made, although this additional amount may be limited (e.g., 10% of the total, X dollars) to prevent fraud. Or the workflow 1017 may be paused to charge the additional amount, and proceed once the charge is successful.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A multi-function printer, comprising:
a proximity network interface operable to communicate with a mobile user device in proximity to the multi-function printer; and
a processor coupled to the network interface, the processor operable to:
determine a workflow specified by a user of the mobile device;
send an ephemeral token associated with the workflow to the mobile user device, the mobile device using the ephemeral token to create a payment packet that is sent to a payment server which sends a receipt in response thereto;
receive the receipt from the mobile device;
in response to receiving the receipt, obtain a list of payments from the payment server; and
perform the workflow based on validating the receipt against the list of payments.

2. The multi-function printer device of claim 1, wherein the receipt comprises a cryptographic digest.

3. The multi-function printer device of claim 1, wherein the payment service comprises a payment gateway that provides access to a plurality of payment providers via a common interface.

4. The multi-function printer device of claim 3, wherein the plurality of payment providers comprises two or more of a credit card service, a debit card service, a mobile payment service, and a cryptocurrency service.

5. The multi-function printer of claim 1, wherein the communications between the multi-function printer and the mobile user device are intermediated by a hub device that is capable of providing services of one or more other multi-function printers to the mobile user device.

6. The multi-function printer of claim 1, wherein determining the workflow comprises setting a number of units limit or monetary limit on the workflow that defines a payment limit defined in the payment packet, and wherein the processor is further configured to make an adjustment to the payment limit at the payment server after performing the workflow.

7. The multi-function printer device of claim 1, wherein the proximity network interface facilitates communication by at least one of Bluetooth, Wi-Fi Direct, Zigbee, and near-field communications.

8. The multi-function printer of claim 7, wherein the mobile device and multi-function printer utilize Bluetooth Low Energy with Generic Attribute Profiles that define the interactions therebetween.

9. A method, comprising:
coupling a multi-function printer to a mobile device via a proximity network interface;
determining at the multi-function printer a workflow specified by a user of the mobile device;
sending an ephemeral token associated with the workflow from the multi-function printer to the mobile user device, the mobile device using the ephemeral token to create a payment packet that is sent to a payment server which sends a receipt in response thereto;
receiving the receipt at the multi-function printer from the mobile device;
in response to receiving the receipt, obtaining a list of payments at the multi-function printer from the payment server; and
performing the workflow via the multi-function printer based on validating the receipt against the list of payments.

10. The method of claim 9, wherein the receipt comprises a cryptographic digest.

11. The method of claim 9, wherein the payment service comprises a payment gateway that provides access to a plurality of payment providers via a common interface.

12. The method of claim 11, wherein the plurality of payment providers comprises two or more of a credit card service, a debit card service, a mobile payment service, and a cryptocurrency service.

13. The method of claim 9, wherein the communications between the multi-function printer and the mobile user device are intermediated by a hub device that is capable of providing services of one or more other multi-function printers to the mobile user device.

14. The method of claim 9, wherein the workflow provides a product and a service to the user.

15. The method of claim 9, wherein determining the workflow comprises setting a number of units limit or monetary limit on the workflow that defines a payment limit defined in the payment packet, the method further comprising making an adjustment to the payment limit at the payment server after performing the workflow.

16. A method comprising:

connecting a multi-function printer to a mobile user device via a proximity network;

determining, at the multi-function printer, a workflow of the multi-function printer specified by a user of the mobile device;

receiving payment information associated with the workflow from the mobile user device at the multi-function printer, wherein the payment information is encrypted in a first packet;

sending a payment request from the multi-function printer to a payment server, the payment request including the first packet and a second packet with a workflow identifier and payment amount encrypted therein;

determining at the multi-function printer via the payment server that the payment server has authorized the payment, wherein the payment server authorizes the payment if the first and second packets agree on the payment and the workflow identifier; and performing the workflow in response to determining the payment gateway authorizes the payment.

17. The method of claim 16, wherein the payment server comprises a payment gateway that provides access to a plurality of payment providers via a common interface, the method further comprising, facilitating selection of the payment providers via a user interface of the mobile device.

18. The method of claim 16, wherein determining the workflow comprises setting a number of units limit or monetary limit on the workflow that defines a payment limit defined in a payment packet, the method further comprising making an adjustment to the payment limit at the payment server after performing the workflow.

19. The method of claim 16, wherein the mobile device and multi-function printer utilize Bluetooth Low Energy with Generic Attribute Profiles that define the interactions therebetween to establish the proximity network.

* * * * *